March 19, 1968   A. J. INGOLIA   3,374,007

TANK FILLER ARRANGEMENT

Filed June 9, 1966

INVENTOR.
Anthony J. Ingolia
BY
George E. Johnson
ATTORNEY

United States Patent Office 3,374,007
Patented Mar. 19, 1968

3,374,007
TANK FILLER ARRANGEMENT
Anthony J. Ingolia, St. Clair Shores, Mich., assignor to General Motors Corporation, Detroit, Mich., a corporation of Delaware
Filed June 9, 1966, Ser. No. 556,503
6 Claims. (Cl. 280—152)

ABSTRACT OF THE DISCLOSURE

An automobile fuel tank filler arrangement including two covers which are simultaneously operable, one cover being a sealing closure and the other being ornamental ordinarily but also serving as a trough support for a gas pump nozzle during tank filling.

---

This invention relates to a tank filler arrangement and more specifically to an arrangement normally and esthetically closing and concealing a tank filler pipe.

A combined tail lamp and gas tank filling vent pipe is disclosed in the prior art and comprises a lamp cover arrangement which protrudes from the supporting body and interferes with the insertion of a filler nozzle so that an operator must hold the latter with care and with slight, if any, support of the nozzle being provided by the equipment involved.

Particularly if used on a car, spillage of fuel on the car body exterior should be avoided during the filling process, access to the filler neck tank opening should be as simple and direct as possible and the neck opening cover should be fixed to the car or tank support at all times to prevent its possible loss.

A feature of the present invention comprises a tank filler arrangement having two covers which are simultaneously operable as a unit with one of the covers being ornamental in its closed position and trough-like in its open position and the other being adapted to form a tight closure.

This and other features of the invention will now be described in detail in the specification and then pointed out more particularly in the appended claims.

Figure 1:
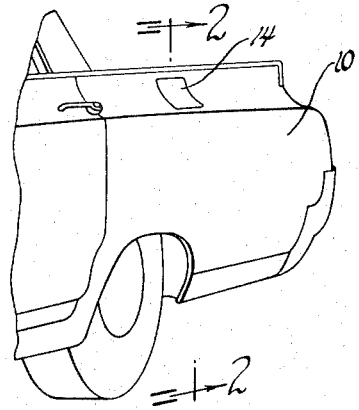
FIGURE 1 is a perspective view of a rear quarter portion of an automobile showing a filler arrangement embodying the present invention as installed.

A left rear fender or body portion of an automobile is shown at 10 in FIGURE 1. This constitutes a supporting means for a tank filler pipe 12, first and second covers 14 and 16 respectively, and recess wall structure 18.

Figure 2:
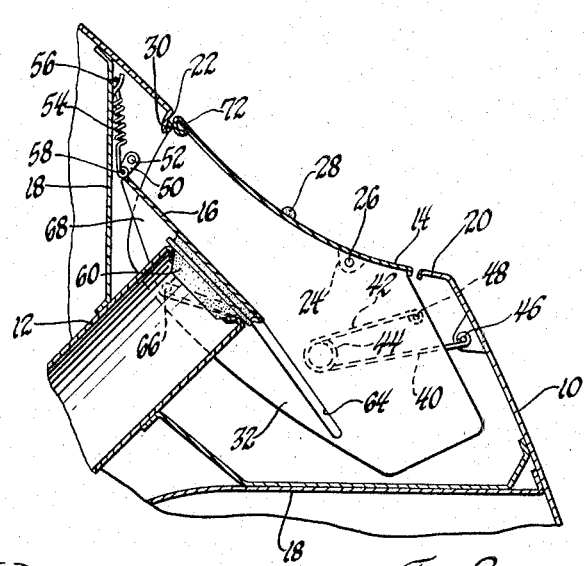
FIGURE 2 is an enlarged sectional view looking in the direction of the arrows 2—2 in FIGURE 1 with the arrangement closed.
Figure 3:
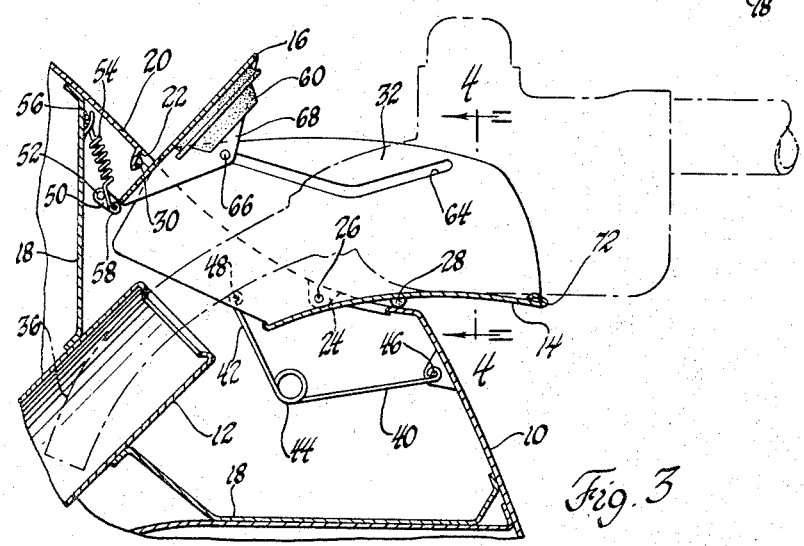
FIGURE 3 is a view similar to that of FIGURE 2, but with the arrangement open and a filler nozzle positioned for filling and drawn in dot and dash lines.
Figure 4:
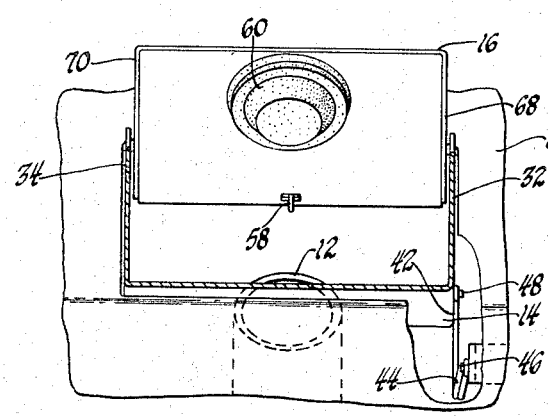
FIGURE 4 is a view looking in the direction of the arrows 4—4 in FIGURE 3.

The supporting means includes shield means or immediate sheet metal 20 defining an access aperture 22 in line with the filler pipe 12. Opposite sides of the aperture 22 are closely approached by the sides of the first cover 14 so that when the latter is closed, it smoothly conforms with the outer surface contour of the shield means 20. The latter is provided with two depending coaxial ears such as the ear 24 each to accommodate a pivot pin such as the pin 26 around which the cover 14 is adapted to rotate. Conveniently, stop means such as a rubber knob may be placed on the first cover at 28 and on the shield means 20 as at 30 limiting the extent of rotation of the first cover 14 from its fully open position as in FIGURE 3 to its fully closed position as shown in FIGURE 2. The pivot pins for the first or outside cover 14 are received by the vertical and parallel sides 32 and 34 of the cover and the latter with its sides 32 and 34 form a trough or saddle for the reception of a filler nozzle 36 when the cover is inverted or open as seen in FIGURES 3 and 4.

The extended ends 40 and 42 of a coil spring 44 are pivoted at 46 to the supporting means 10 and the first cover at 48 respectively. The arrangement with respect to the outside cover pivot pins is such that when the cover 14 is closed, the spring 44 tends to hold it closed as in FIGURE 2 and when it is open, as in FIGURE 3, the spring tends to hold it open. In FIGURE 2, the spring 44 exerts a force at pivot 48 upward and counterclockwise with respect to the pivot pin 26. In FIGURE 3, the line of force between the two ends of the spring 44 has passed the pin 26 and is urging the cover to rotate clockwise.

The second or inner cover or cap 16 bears two tabs such as the tab 50 and each is pivoted on a pin 52 so that the cover may rotate on the pins 52 and with relation to the open end of the filler pipe 12. A spring 54 has one end fixed as at 56 and the other pivoted as at 58 to the cover 16. A pad 60 is attached to the cover 16 and positioned resiliently to engage and seal the pipe 12 as seen in FIGURE 2.

The sides 32 and 34 of the cover 14 are each provided with a cam slot as at 64 for guiding a pin such as the pin 66. Each pin is fixed to a side flange 68 or 70 depending from the cover 16 so that the first and second covers are simultaneously operable. The top rim 72 of the cover 14 may be notched to facilitate manual opening of the covers.

To open the covers, the cover 14 is tipped or rotated clockwise from its position as shown in FIGURES 1 and 2 to its position as shown in FIGURE 3. The spring 44 at first resists the rotation and then aids in it. The cam and slot arrangement simultaneously opens the cap or cover 16 and during the last portion of the opening movement the spring 54 goes over center and holds the cover 16 open and out of the way for the subsequent free insertion of the filler nozzle 36. The trough-like form or U-shaped cross-section of the cover 14 permits easy access and the nozzle 36 has a firm resting place contributing to the ease of filling.

I claim:

1. A fuel tank filler arrangement comprising one end of a filler pipe, supporting means for said filler pipe including shield means, an access aperture in said shield means giving access to said one end, a first cover for closing said aperture, a second cover for closing said one end, said covers being independently pivoted on said supporting means, means connecting said covers for simultaneous operation, and said covers while open defining a passage between them in alignment with the axis of said filler pipe.

2. A fuel tank filler arrangement as set forth in claim 1, the said first cover smoothly conforming with the outer surface contour of said shield means.

3. A fuel tank filler arrangement as set forth in claim 1, said covers having pivotal axes on opposed sides of the axis of said filler pipe for rotation in opposite directions to gain access to said one end.

4. A fuel tank filler arrangement as set forth in claim 1, cam means for actuating said second cover by operating said first cover.

5. A fuel tank filler arrangement as set forth in claim 1, over-centering spring means acting between said supporting means and at least one of said covers to hold it open and closed.

6. A fuel tank filler arrangement comprising a filler pipe end, shield means for said pipe end, an access aperture in said shield means in alignment with the axis of said pipe end, a first cover pivotally mounted for ornamentally closing said aperture, a second cover pivotally mounted for sealing said pipe end, said first cover having an upright U-shaped cross section forming a trough leading to said pipe end when said first cover is in open position, and means connecting said covers for simultaneous operation.

References Cited

UNITED STATES PATENTS

| | | | |
|---|---|---|---|
| 2,314,710 | 3/1943 | Keller | 280—152 |
| 2,417,324 | 3/1947 | Rivard et al. | 296—28 |
| 2,808,257 | 10/1957 | Brookbank | 268—74 |
| 2,893,779 | 7/1959 | Bayley | 296—1 |

LEO FRIAGLIA, *Primary Examiner.*

BENJAMIN HERSH, *Examiner.*

J. E. SIEGEL, *Assistant Examiner.*